June 23, 1964     T. B. KING     3,137,954
METALLIC HOLDER
Filed July 7, 1961

INVENTOR.
THOMAS B. KING
BY
ATTORNEYS

United States Patent Office 3,137,954
Patented June 23, 1964

3,137,954
METALLIC HOLDER
Thomas B. King, Grand Rapids, Mich., assignor to Light Metals Corporation, Grand Rapids, Mich., a corporation of Michigan
Filed July 7, 1961, Ser. No. 122,471
3 Claims. (Cl. 40—10)

This invention relates to a metallic article and a method of making the same. More particularly, this invention relates to a method for forming a holder or similar article from extruded materials, the article including a means for supporting it.

Many structures are presently in existence for holding items such as cards and the like. Up to this time, it has been impractical to form such holders from extruded materials because of costs involved in providing a suitable means to support the holder and rigidify it. It is an object of this invention to provide a method of fabricating a metallic article, such as a holder, and a means for supporting the same.

It is a further object of this invention to provide an article of manufacture especially well adapted to receive and hold cards, such as price identification cards in grocery stores, and a method of making the article.

Another object of this invention is to provide such a holder which is easily fabricated from extruded metals, and exhibits exceptional rigidity and durability.

A still further object of this invention is to provide such a structure which includes its own supporting means.

These and other objects of this invention will become obvious to those skilled in the art of holders and methods of making them upon reading the following specification in conjunction with the accompanying drawings, wherein.

Briefly, this invention relates to a method for forming a holder and the like, the first step being the provision of an elongated frame member and bending the ends of the frame member to lie generally perpendicular thereto. Next, the frame member is formed to the desired configuration, the ends thereof being brought into proximity to depend therefrom. A clamping bracket is provided, having an aperture therethrough. The clamping bracket is positioned such that the ends of the frame member extend into the aperture. This clamping bracket is then clamped about the frame member.

Figure 1:
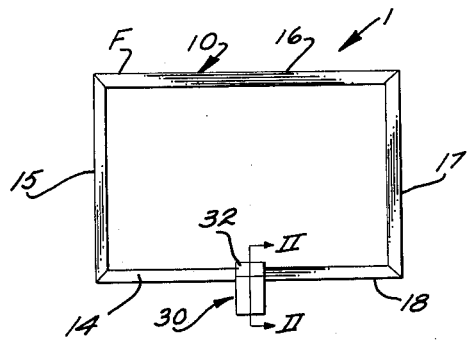
FIG. 1 is a front view of a holder made in accordance with the method of this invention.

Referring more specifically to the drawings, the reference numeral 1 in FIG. 1 designates a holder formed according to the method of this invention. The holder 1 includes a frame F formed from a frame member 10 and a clamping bracket 30. It should be understood that the method of this invention may be utilized to fabricate many types of articles of this general nature.

Figure 3:
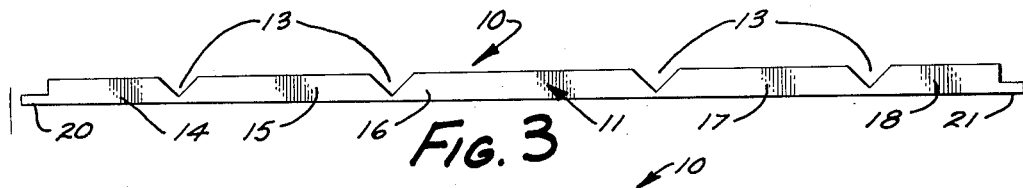
FIG. 3 is a side view of the frame member used in forming the holder shown in FIG. 1.
Figure 4:
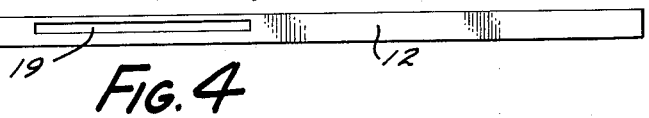
FIG. 4 is a bottom view of the frame member shown in FIG. 3.
Figure 5:
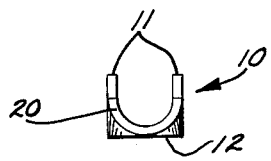
FIG. 5 is an end view of the frame member shown in FIG. 3, the end thereof being formed in a generally semi-circular configuration in accordance with the method of the invention.

In the embodiment shown, the frame member 10 is formed from an elongated extruded, channel-shaped member (FIGS. 3 and 5). It has been found that an extruded aluminum frame member is especially well adapted for use in the method of this invention. The channel-shaped frame member includes a pair of walls 11 connected along their bottom by a web 12. A plurality of V-shaped notches 13 are cut in the walls 11 to facilitate bending of the frame member to the desired configuration. The V-shaped notches divide the frame member into five segments, designated by the reference numerals 14–18 respectively. An elongated slot 19 is formed in the web 12 of frame member 10 (FIG. 4) extending the length of segment 16, the purpose of which will be fully explained hereinafter. The ends 20 and 21 of web 12 extend beyond segments 14 and 18 as shown in FIG. 3. These ends are bent in a generally semi-circular shape as shown in FIG. 5, the purpose of which will be explained hereinafter.

The clamping bracket 30 (FIG. 6) includes an aperture 31 extending therethrough, and a pair of arms 32 extending from one end thereof. The free end of each arm is formed to provide a hook 33. The body of the clamping bracket 30 is of a length greater than the ends 20 and 21 of the frame member 10.

Figure 2:
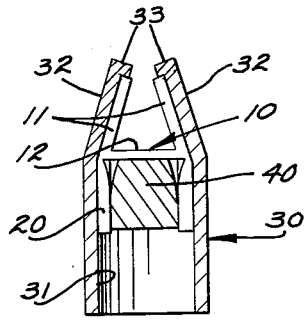
FIG. 2 is a cross-sectional view taken along the plane II—II in FIG. 1.
Figure 6:
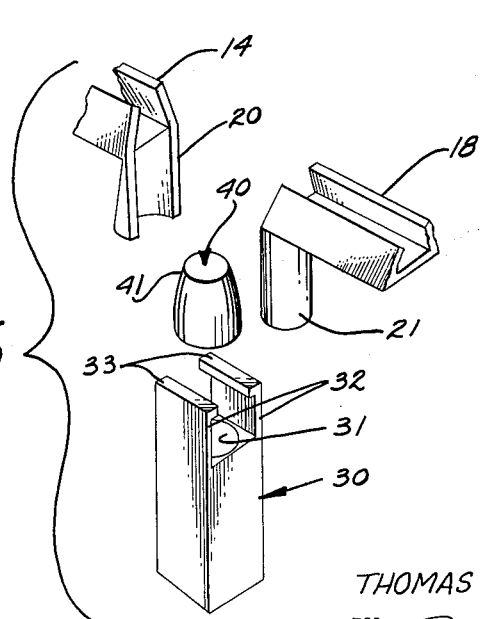
FIG. 6 is an exploded, perspective view of the frame member, clamping bracket and pin positioned for assembly.

Upon extrusion of the frame member 10, the cutting of notches 13 therein and the bending of ends 20 and 21 into a generally semi-circular shape, the frame member 10 is then bent to the desired configuration. The notches 13 facilitate the bending of the frame member 10 into the rectangular configuration shown in FIG. 1, segment 16 forming the top of the frame, segments 15 and 17 forming the sides and segments 14 and 18 forming the bottom thereof. Upon bringing the ends 20 and 21 of frame member 10 adjacent one another, it will be noted that these ends depend from the segments 14 and 18 (FIG. 6). The clamping bracket 30 is then positioned such that the ends 20 and 21 extend into the aperture 31 thereof, the arms 32 of the clamping bracket 30 extending about the walls 11 of the frame member 10 (FIG. 2). The hook portions 33 of the arms 32 lie above the walls 11 and upon clamping the same 32 together, the bracket 30 is secured to the frame member 10. The bracket 30 is not movable vertically because the arms 32 with hooks 33 hold it rigidly against the bottom of the frame. The bracket 30 cannot move sideways and the segments 14 and 18 of the frame member cannot move toward or away from each other because of the ends 20 and 21 which extend into the aperture 31 of the clamping bracket 30. In order to rigidify the structure still further, a peg or pin 40, having a slight tape 41 at one end thereof, is inserted upwardly into the bottom of the clamping bracket 30, through the aperture 31 and driven between the ends 20 and 21 of the frame member. This binds the ends 20 and 21 between the pin 40 and the walls of the aperture 31.

Because the body of the clamping bracket 30 is of a length greater than the ends 20 and 21 of the frame member 10, an upstanding rod (not shown) may be inserted into the aperture, for detachably supporting the holder 1. A card (not shown), such as a price card, may be inserted into the slot 19 at the top of the holder for support therein, the card being quickly and easily removable therefrom.

It will be noted that the method of this invention has provided an extremely simplified method of fabricating an article such as the card holder shown. The holder is especially well adapted to be formed from a length of extruded metal, such as aluminum. The holder is economical and may be practically fabricated, yet exhibiting proper strength, rigidity and durability. The holder includes its own supporting mechanism, which simultaneously functions as a means for clamping the ends of the extruded frame member together.

While only one embodiment of this invention has been shown and described, it may be possible to practice the invention through the utilization of certain other embodiments without departing from the spirit and scope of this invention. Such other embodiments are to be included as part of this invention unless the following claims specifically state otherwise.

I claim:

1. A holder, comprising: an extruded, channel-shaped frame member, the ends thereof bent and depending therebelow; a clamping bracket having an aperture extending therethrough and a pair of arms; said ends of said frame member extending into said aperture; and said arms clamped about said frame member.

2. A holder, comprising: an extruded, channel-shaped frame member, the ends thereof bent to a generally semicircular shape and depending therebelow; a clamping bracket having an aperture extending therethrough and a pair of arms; said ends of said frame member extending into said aperture; and said arms clamped about said frame member.

3. A holder, comprising: an extruded, channel-shaped frame member, the ends thereof bent to a generally semicircular shape and depending therebelow; a clamping bracket having an aperture extending therethrough and a pair of arms; said ends of said frame member extending into said aperture; said arms clamped about said frame member; and a pin positioned between said ends, binding said ends between said pin and said clamping bracket.

References Cited in the file of this patent

UNITED STATES PATENTS

| 531,795 | Green | Jan. 1, 1895 |
| 574,986 | Dreisbach | Jan. 12, 1897 |
| 1,440,665 | Fink | Jan. 2, 1923 |
| 1,968,219 | Pfaff | July 31, 1934 |
| 2,521,603 | Prew | Sept. 5, 1950 |